United States Patent
Kawamura et al.

(10) Patent No.: US 8,887,661 B2
(45) Date of Patent: Nov. 18, 2014

(54) FLOW REGULATING MEMBER OF HOT DIP COATING TANK AND CONTINUOUS HOT DIP COATING SYSTEM

(75) Inventors: Mikio Kawamura, Tokyo (JP); Yu Yamauchi, Tokyo (JP); Tsukasa Oyama, Tokyo (JP); Masaaki Omodaka, Tokyo (JP); Makoto Kusama, Tokyo (JP); Koichi Nishizawa, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 0 days.

(21) Appl. No.: 13/995,314

(22) PCT Filed: Jan. 16, 2012

(86) PCT No.: PCT/JP2012/050743
§ 371 (c)(1),
(2), (4) Date: Jun. 18, 2013

(87) PCT Pub. No.: WO2012/096402
PCT Pub. Date: Jul. 19, 2012

(65) Prior Publication Data
US 2013/0263778 A1 Oct. 10, 2013

(30) Foreign Application Priority Data
Jan. 14, 2011 (JP) .................. 2011-005848

(51) Int. Cl.
*B05C 3/02* (2006.01)
*G05D 5/02* (2006.01)
*C23C 2/00* (2006.01)
*C23C 2/40* (2006.01)
*C23C 2/06* (2006.01)

(52) U.S. Cl.
CPC ...... *C23C 2/003* (2013.01); *G05D 5/02* (2013.01); *C23C 2/40* (2013.01); *C23C 2/06* (2013.01)
USPC ............ 118/424; 118/428; 118/429; 118/419

(58) Field of Classification Search
CPC .................................. C23C 2/003; B05C 3/02
USPC .......... 118/428, 424, 429, 419; 427/431, 433, 427/434.2–434.5, 349
See application file for complete search history.

(56) References Cited

U.S. PATENT DOCUMENTS 4,128,668 A * 12/1978 Ernest ........................ 427/349
2009/0183674 A1 * 7/2009 Kuwana et al. ............. 118/429

FOREIGN PATENT DOCUMENTS

JP 09-316620 12/1997
(Continued)

OTHER PUBLICATIONS

International Search Report dated Apr. 17, 2012, issued in corresponding PCT Application No. PCT/JP2012/050743.

*Primary Examiner* — Yewebdar Tadesse
(74) *Attorney, Agent, or Firm* — Kenyon & Kenyon LLP (57) ABSTRACT

A flow regulating member of a hot dip coating tank which can suppress stir-up of bottom dross, characterized by being provided with horizontal plates which are respectively arranged horizontally from below two side end parts of a sink roll, which is arranged inside of a coating tank in a rotatable manner, toward outside directions of the sink roll and louvers which are arranged above from the end parts of the respective horizontal plates at positions separated from the two ends of the sink roll and which have flow direction changing members which are slanted so that their heights become gradually higher toward the wall surface sides of the coating tank.

9 Claims, 9 Drawing Sheets

(56) References Cited

FOREIGN PATENT DOCUMENTS

| | | |
|---|---|---|
| JP | 2000-054097 | 2/2000 |
| JP | 2002-069602 | 3/2002 |
| JP | 2006-316346 | 11/2006 |
| WO | 2007/139206 | 12/2007 |

* cited by examiner

FLOW REGULATING MEMBER OF HOT DIP COATING TANK AND CONTINUOUS HOT DIP COATING SYSTEM

This application is a national stage application of International Application No. PCT/JP2012/050743, filed Jan. 16, 2012, which claims priority to Japanese Application No. 2011-005848, filed Jan. 14, 2011, the content of which is incorporated by reference in its entirety.

TECHNICAL FIELD

The present invention relates to the art of inhibiting stir-up of bottom dross due to a flow of a hot dip coating metal occurring along with running of a steel sheet or rotation of a sink roll.

BACKGROUND ART

Figure 10:
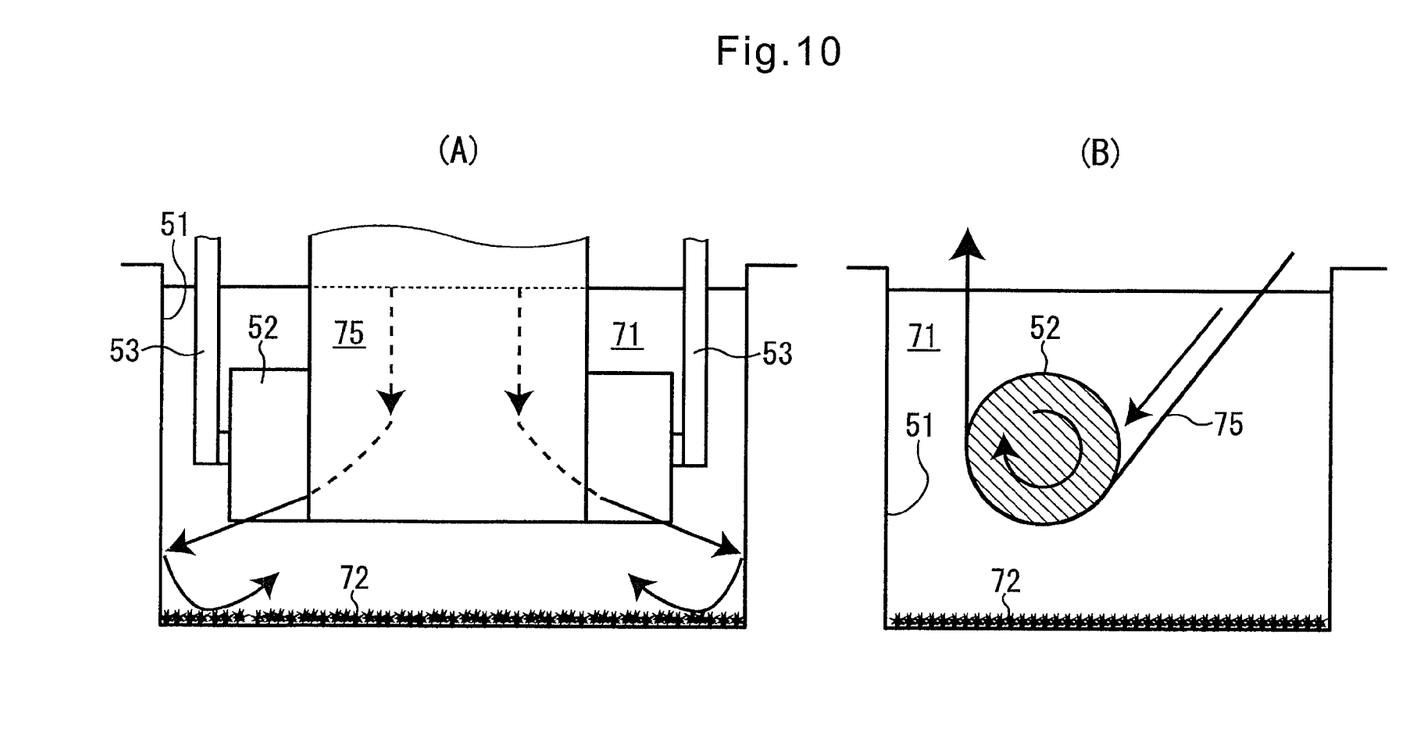
FIG. 10 An explanatory view of a conventional hot dip galvanizing system.

A hot dip galvanizing system which performs hot dip galvanization on a steel sheet, as shown in FIG. 10, is comprised of a coating tank 51 in which molten zinc 71 is filled and a sink roll 52 which is supported by roll support members 53 to hang down inside the coating tank 51 in a rotatable manner. A steel sheet 75 which enters the inside of the coating tank 51 from above is wound around the sink roll 52 whereby it is changed in direction to head upward and is pulled up from the coating tank 51. During this time, the surface of the steel sheet 75 has molten zinc deposited on it whereby a galvanized layer is formed.

If performing such hot dip galvanization, the iron which is eluted from the steel sheet and the molten zinc react whereby bottom dross 72 which is mainly comprised of an iron-zinc alloy is produced and deposits at the bottom of the coating tank 51. In such a hot dip galvanization process, as shown in FIG. 10(B), along with movement of the steel sheet 75 which enters the coating tank 51 from above, a flow in the direction of movement of the steel sheet 75 (below, referred to as a "trailing flow") is formed in the molten zinc 71 which contacts the steel sheet 75. The trailing flow of molten zinc 71, as shown in FIG. 10(A) runs into a dead end at the position where the steel sheet 75 and the sink roll 52 contact and is discharged to the lateral bottom sides of the sink roll 52. The flow of the molten zinc 71 is reflected at the side walls of the coating tank 51, flows downward, and stirs up the bottom dross 72.

If the bottom dross 72 is stirred up, the stirred up bottom dross 72 deposits on the surface of the steel sheet 75. The bottom dross 72 is hard, so at the time of rolling or working, the surface of the steel sheet 75 is formed with dents as bottom dross defects.

PLT 1 and PLT 2 propose the arts of preventing stir-up of bottom dross 72 and preventing bottom dross defects by providing flow regulating members which cover the bottom or sides of the sink roll 52 and blocking the flow of molten zinc 71 toward the lateral bottom sides of the sink roll 52 by the flow regulating members so as to prevent stir-up of the bottom dross 72.

PLT 3 proposes the art of providing the bottom of a sink roll 52 with a flow regulating member which is provided with a plurality of holes so as to prevent stir-up of the bottom dross 72.

CITATIONS LIST

Patent Literature

PLT 1: Japanese Patent Publication No. 2002-69602A
PLT 2: Japanese Patent Publication No. 2000-54097A
PLT 3: WO2007/139206

SUMMARY OF INVENTION

Technical Problem

The flow regulating members which are shown in PLT 1 and PLT 2 are attached to the roll support members 53 which support the sink roll 52 or to the sink roll 52 itself (side members which are shown in PLT 2). Therefore, when pulling up the sink roll 52 from the coating tank 51 to replace the sink roll 52, the flow regulating members have to be detached from the roll support members 53 or the sink roll 52, so the work of replacement of the sink roll 52 becomes troublesome.

Further, when replacing the sink roll 52, the line has to be made to stop and the tension between the steel sheet and the sink roll 52 eased. The flow regulating members which are shown in PLT 1 and PLT 2 completely cover the bottom of the sink roll 52, so if easing the tension between the steel sheet and the sink roll 52, the drooping steel sheet will contact the flow regulating members and damage the steel sheet or the flow regulating members will break.

Further, the bearings of the sink roll 52 are comprised of ceramic. For this reason, to prevent cracking of the ceramic bearings due to sudden heat expansion, before immersing the sink roll 52 and the roll support members 53 in the molten zinc 71, a preheating step of gradually making the sink roll 52 and the roll support members 53 rise in temperature becomes necessary. If the flow regulating members are attached to the sink roll 52 and roll support members 53 at this time, energy is wasted for preheating the flow regulating members.

Furthermore, the flow regulating members entirely cover the bottom of the sink roll 52, so the bottom dross 72 which is produced builds up on the flow regulating members. The built up bottom dross 72 is stirred up by the flow of molten zinc 71 which accompanies rotation of the sink roll 52 and deposits on the surface of the steel sheet 75.

The flow regulating member which is shown in PLT 3 has the effect of attenuating the wall surface flow rate which occurs at the two side surface parts of the sink roll and stirs up the bottom dross. However, it does not have side plates serving as flow regulating plates. The effect is insufficient in particular when the running speed of the steel sheet is fast and when the running steel sheet is wide.

The present invention has as its task to solve the above problems and provide a flow regulating member of a hot dip coating tank which can suppress stir-up of bottom dross and provide a continuous hot dip coating system which uses the same.

Solution to Problem

The inventors worked to complete the above task by studying in depth the structure of a system for preventing stir-up inside of a continuous hot dip plating bath tank. As a result, they discovered as follows. By providing inside the plating bath tank a flow regulating member which is provided with horizontal plates and, as side members, louvers which are provided above the end parts of the bath tank wall side of the horizontal plates in directions vertical to the horizontal plates and have flow direction changing members, the strong flow of the trailing flow can be weakened while passed by a two-stage mechanism. Therefore stir-up of the bottom dross can be effectively prevented.

That is, by using horizontal plates to attenuate the flow of the trailing flow while changing the direction of flow and using louvers which have flow direction changing members at their tips so as to further attenuate and disperse the flow of the trailing flow. Therefore, even if the trailing flow strikes the side walls of the coating tank, it no longer has enough strength to stir up the bottom dross and therefore the flow motion of the trailing flow can be rendered harmless.

The present invention was made based on the above discoveries and has as its gist the following.

(1) A flow regulating member of a hot dip coating tank characterized by being provided with horizontal plates which are respectively arranged horizontally from below two side end parts of a sink roll, which is arranged inside of a coating tank in a rotatable manner, toward outside directions of the sink roll and, as side members, louvers which are arranged above from the end parts of the respective horizontal plates at positions separated from the two ends of the sink roll and which have flow direction changing members which are slanted so that their heights become gradually higher toward the wall surface sides of the coating tank.

(2) The flow regulating member of a hot dip coating tank of (1), characterized in that the louvers have entrance side members which slant so as to gradually increase in height from base ends of the flow direction changing members toward the sink roll direction.

(3) The flow regulating member of a hot dip coating tank of (1) or (2), characterized in that the louvers have plated-shaped ribs which hang down from base ends of the flow direction changing members.

(4) The flow regulating member of a hot dip coating tank of any of (1) to (3), characterized in that a pitch between a bottom end of a flow direction changing member of a louver and a bottom end of the louver which is provided adjoining the louver above it is 100 to 300 mm.

(5) The flow regulating member of a hot dip coating tank of any of (2) to (4), characterized in that an angle θ1 of entrance side members of the louvers with respect to the horizontal plane and an angle θ2 of the flow direction changing members with respect to the horizontal satisfy $-\theta 2 \leq \theta 1 \leq 70°$ and $20° \leq \theta 2 \leq 40°$.

(6) A continuous hot dip coating system characterized by being provided with a flow regulating member of a hot dip coating tank of any of (1) to (5).

(7) The continuous hot dip coating system of (6), characterized in that a horizontal direction dimension from bearing parts of the sink roll in a steel sheet exit side direction is 300 mm or more and in that a horizontal direction dimension from bearing parts of the sink roll in a steel sheet entry side direction is 350 mm or more.

(8) The continuous hot dip coating system of (6) or (7), characterized in that a separation dimension of the louvers and wall surfaces of the coating tank is 50 mm or more.

(9) The continuous hot dip coating system of any of (6) to (8), characterized in that the flow regulating member is laid from below the end parts of the sink roll in inside directions of 0 to 15% of a barrel length of the sink roll.

(10) The continuous hot dip coating system of any of (6) to (9), characterized in that the flow regulating member is attached by the support members and horizontal members to edge faces of the hot dip coating tank.

Advantageous Effects of Invention

In the present invention, the flow regulating member of a hot dip coating tank is characterized by being provided with horizontal plates which are respectively arranged horizontally from below two side end parts of a sink roll, which is arranged inside of a coating tank in a rotatable manner, toward outside directions of the sink roll and louvers which are arranged above from the end parts of the respective horizontal plates at positions separated from the two ends of the sink roll and which have flow direction changing members which are slanted so that their heights become gradually higher toward the wall surface sides of the coating tank. Therefore, a trailing flow of molten zinc strikes the horizontal plates, flows changed in direction toward the outside directions of the horizontal plates, is changed in flow to the upward direction by the flow direction changing members of the louvers, so stir-up of the bottom dross is suppressed.

DESCRIPTION OF EMBODIMENTS

Figure 1:
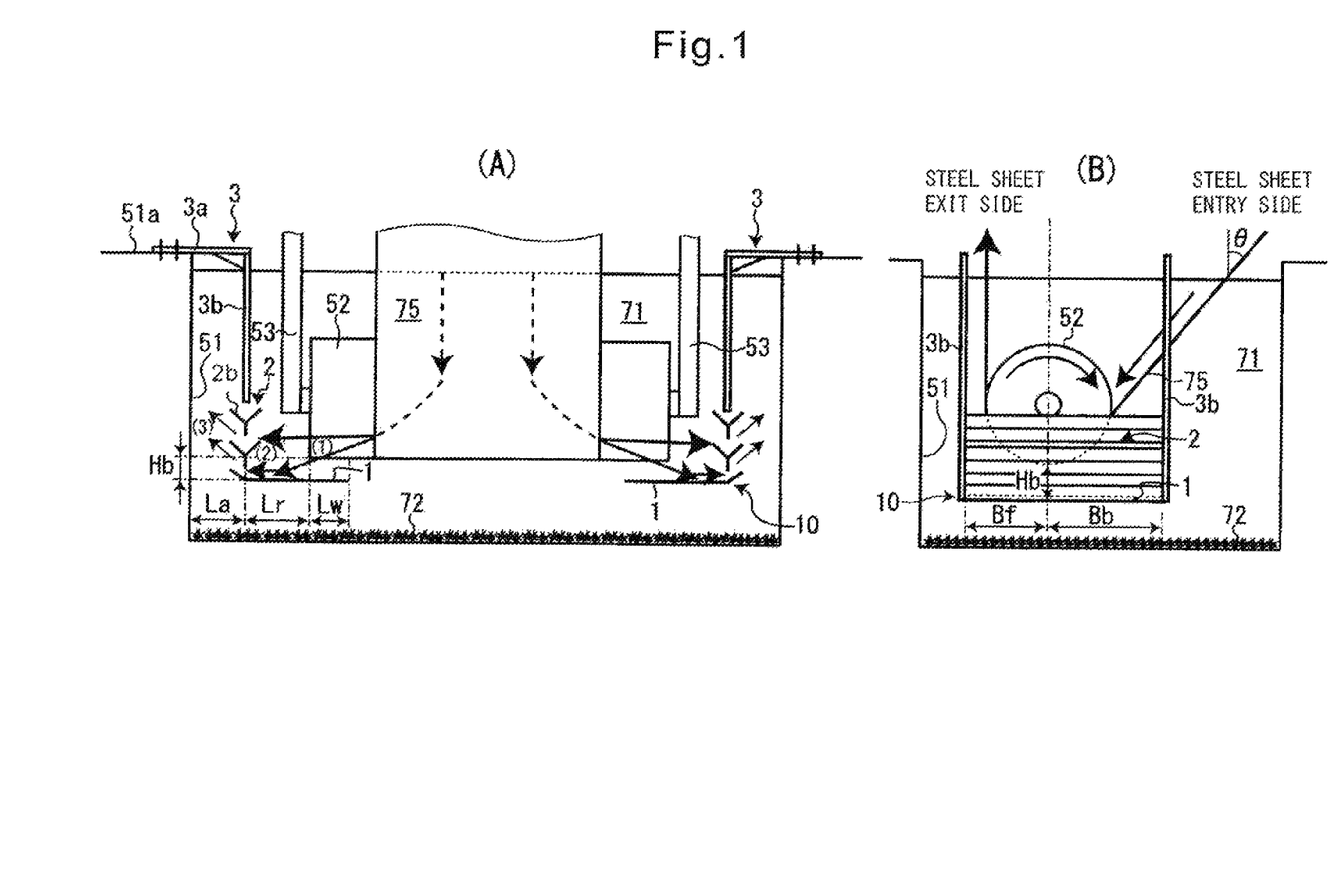
FIG. 1 An explanatory view of a flow regulating member of a hot dip coating tank which shows an embodiment of the present invention.

Below, while referring to the drawings, preferable embodiments of the present invention will be shown. As shown in FIG. 1, a flow regulating member 10 of a hot dip coating tank of the present invention (below, simply referred to as the "flow regulating member 10") is comprised of horizontal plates 1 and side members made of louvers 2. The horizontal plates 1 are arranged from below two side ends of a sink roll 52 toward outside directions of the sink roll 52 in the horizontal direction. As shown in FIG. 1(A), the horizontal plates 1 are not positioned below a steel sheet 75.

As shown in FIG. 1(A), the louvers 2 are arranged upward from the ends of the horizontal plates 1 at positions separated from the two ends of the sink roll 52.

Figure 2:
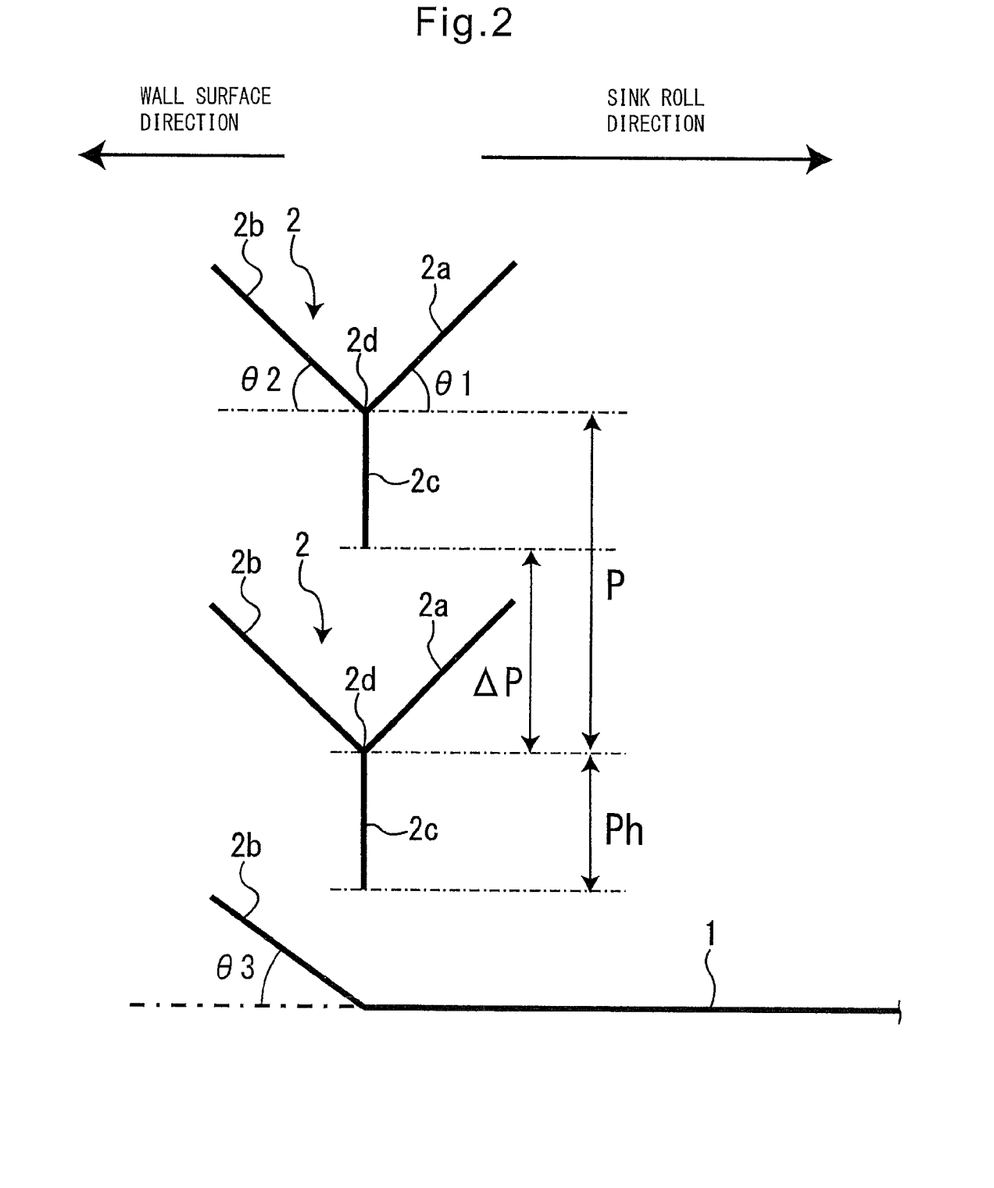
FIG. 2 A detailed diagram of louvers.

As shown in FIG. 2, the louvers 2 are comprised of entrance side members 2a, flow direction changing members 2b, and plate-shaped ribs 2c. The entrance side members 2a slant so as to gradually increase in height from joints 2d of base ends of flow direction changing members 2b (sink roll 52 direction side ends) toward the sink roll 52 direction. The flow direction changing members 2b slant so as to gradually increase in height toward the wall surface direction of the coating tank 51. The plate-shaped ribs 2c hang down from the joints 2d of the base ends of the flow direction changing members 2b. These form cross-sectional shapes of figure Y-shapes.

Pluralities of such louvers 2 are arranged in the vertical direction. In the present embodiment, as one embodiment of the present invention, two louvers 2 are provided in the vertical direction. The flow direction changing members 2b are attached at the wall surface direction ends of the horizontal plates 1.

As shown in FIG. 1(A), the flow regulating member 10 which is comprised of the horizontal plates 1 and the louvers 2 is supported by support members 3 which are attached to the coating tank 51. In other words, the flow regulating member 10 is not attached to the sink roll 52 or roll support members 53 which support the sink roll 52. For this reason, when replacing the sink roll 52, the flow regulating member 10 is not pulled up from the coating tank 51, so the work of replacement of the sink roll 52 does not become troublesome. In the present embodiment, as shown in FIG. 1(A), the support members 3 are comprised of horizontal members 3a which are attached to edge faces 51a of the coating tank 51 and extend to the inside of the coating tank 51 in the horizontal direction and vertical members 3b which hang down from the front ends of the horizontal members 3a and which support the louvers 2 or horizontal plates 1.

Next, using FIG. 2, the action of the flow regulating member 10 of the present invention will be explained. As shown in FIG. 2, (1), a trailing flow of the molten zinc 71 which is discharged to a lateral bottom side of the sink roll 52 strikes a horizontal plate 1 and flows changed in direction to the outside direction of the horizontal plate 1 (louver 2 direction) (FIG. 1(A), (2)). At this time, the flow rate of the trailing flow is attenuated. Further, if the trailing flow reaches the louvers 2, the trailing flow strikes the entrance side members 2a and the ribs 2c and is attenuated in flow rate, then is changed in direction of flow to an upward direction by the flow direction chamber members 2b of the louvers 2 and flows to the wall surface side of the coating tank 51 (FIG. 1(A), (3)). In this way, the trailing flow is attenuated in flow rate by the louvers 2, then is changed in direction of flow to the upward direction and flows to the wall surface side of the coating tank 51, so even if the trailing flow strikes the wall surface of the coating tank 51, stir-up of the bottom dross 72 is suppressed.

Note that the horizontal plates 1 are flat plate shapes and are arranged in the horizontal direction, so dross will almost never accumulate on the horizontal plates 1. However, when operation is stopped etc., slight dross may accumulate, so the horizontal plates 1 may also be provided with holes. Even if the horizontal plates 1 are provided with holes, the trailing flow will strike the horizontal plates 1 at a slant, so the mechanism by which the flow rate is attenuated and the direction of flow is changed to an upward direction will work. However, when the running speed is fast, the trailing flow which passes through the holes easily causes dross to be stirred up, so the horizontal plates 1 are preferably flat plates with no holes.

Below, using FIG. 3 and Table 1, the advantageous effects of the flow regulating member 10 of the present invention will be explained. The inventors ran tests on a flow regulating member of a hot dip coating tank wherein they filled water into a water tank representing a coating tank, caused the precipitation of tracers 73 simulating bottom dross, and matched the Froude number in a coating tank in actual operation and the Froude number in the water tank representing the coating tank (water model test) so as to study various structures. In the water model tests, as the tracers, they used acryl particles of a particle size of 10 to 300 μm and density of 1050 kg/m$^3$, while for the stir-up of the precipitated tracers, they used a commercially available solution particle counter which enables the range of particle size and the number of particles to be counted by a laser scattering method. For evaluating the stir-up of the tracers 73 simulating the bottom dross, a dross stir-up index Dr was used. Here, the "dross stir-up index Dr" is the dimensionless index which is represented by the following formula (I).

Dr=number of tracers of particle size of 50 μm or more stirred up/Total number of stirred up tracers  (1)

TABLE 1

| Structure | A: Roll bottom members | B: Side members | Bottom dross stir-up index |
| --- | --- | --- | --- |
| (1) | No roll bottom members | No side members | 1.0 |
| (2) | Horizontal plates | Flat plates (no holes) | 0.8 |
| (3) | Punched metal sheets | Flat plates (no holes) | 0.6 |
| (4) | Punched metal sheets | No side members | 0.4 |
| (5) | Punched metal sheets with flow direction changing members | Louvers | 0.4 |
| (6) | Horizontal plates with flow direction changing members | Louvers | 0.2 |

Figure 3:
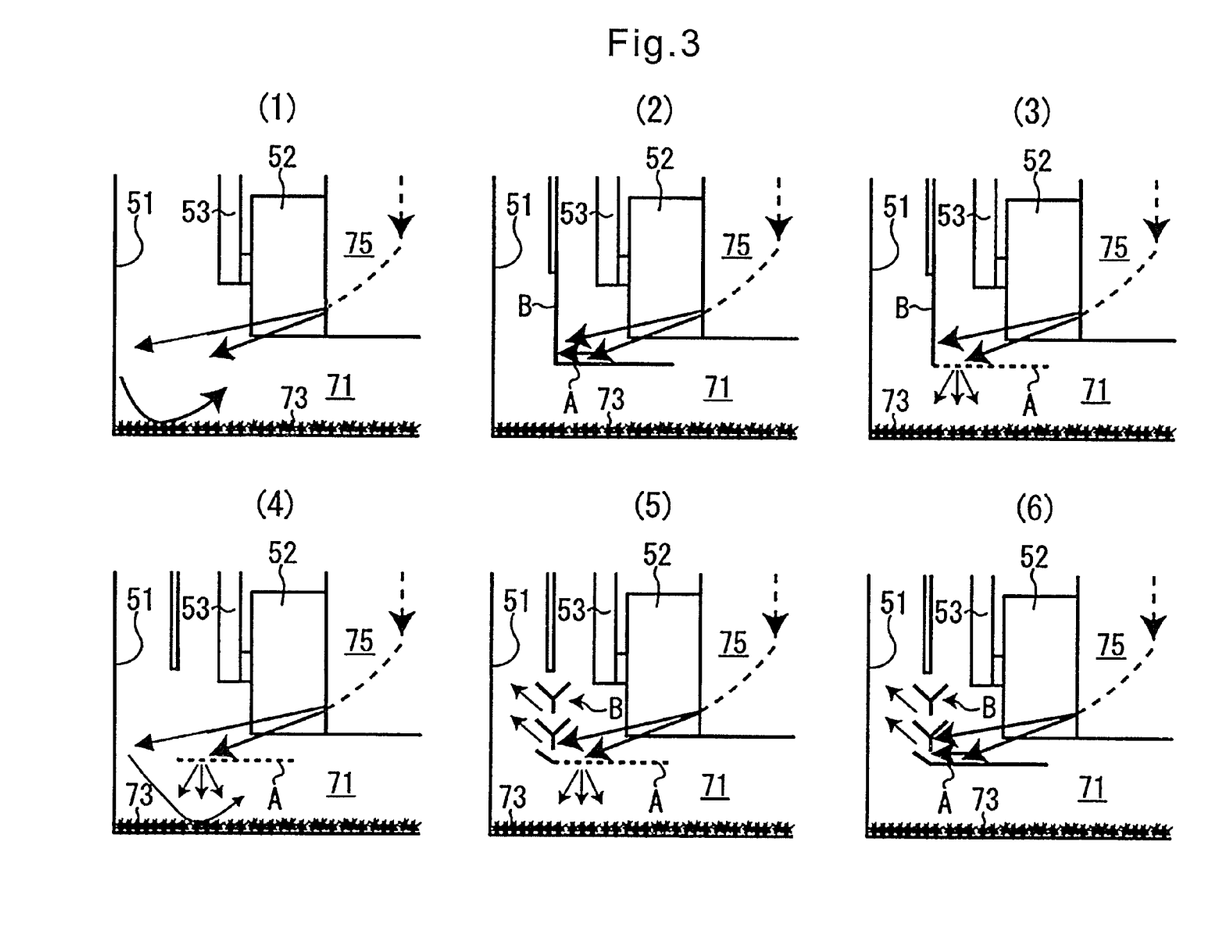
FIG. 3 An explanatory view which shows the advantageous effect of the present invention.

FIG. 3, (2) shows a case when forming the roll bottom member A by a horizontal plate and the side member B which is arranged above the end parts by a flat plate (no holes). In this case, the trailing flow of the molten zinc 71 which is discharged to the lateral bottom side of the sink roll 52 strikes and is reflected at the horizontal plate A and the side member B (flat plate (no holes)), is discharged along the flow of the steel sheet 75 from the deepmost part of the horizontal plate 1 (paper depth side), and stirs up the tracers 73 which simulated the bottom dross.

As shown in FIG. 3, (3), when forming the roll bottom member A by a punched metal sheet and the side member B by a flat plate (no holes), the trailing flow of the molten zinc 71 which is discharged to the lateral bottom side of the sink roll 52 becomes a downward flow which is dispersed by the punched metal sheet comprising the roll bottom member A and a downward flow which strikes and is reflected at the side member B and flows down from the part of the center bottom of the roll with no roll bottom member A. In this case as well, the stir-up of the bottom dross 72 by the trailing flow is reduced compared with the case of no roll bottom member A and side member B (FIG. 3, (1)), but the trailing flow which is dispersed and flows downward stirs up the tracers 73 simulating the bottom dross.

As shown in FIG. 3, (4), when making the roll bottom member A a punched metal sheet and eliminating the side member B, the trailing flow of the molten zinc 71 which is discharged to the lateral bottom side of the sink roll 52 includes a flow which is dispersed by the roll bottom member A and flows downward and a flow which directly strikes the wall surface or is reflected at the roll bottom member A and then strikes it. At this time, the trailing flow which strikes the wall surface and flows downward stirs up the tracers 73 simulating the bottom dross.

As shown in FIG. 3, (5), when making the roll bottom member A a punched metal sheet with a flow direction changing member and making the side member B louvers 2, the main flow of the trailing flow of the molten zinc 71 which is discharged to the lateral bottom side of the sink roll 52 is attenuated in flow rate by the louvers 2 comprising the side member B, the upward flow is changed, and the zinc flows along the wall surface side of the coating tank 51. However, when the running speed is fast, part of the trailing flow which is dispersed at the roll bottom member A and flows downward stirs up the tracers 73 simulating the bottom dross.

As shown in FIG. 3, (6), when making the roll changing bottom A member a flat plate with a flow direction changing member and making the side member B louvers 2, the amount of stir-up of the tracers 73 simulating the bottom dross becomes the smallest.

Next, the preferable sizes and installation locations of the horizontal plates serving and louvers will be explained.

In general, a sink roll 52 has an outside diameter of 600 to 1000 mm (mostly 800 mm or so) and a width dimension of 1800 to 2800 mm (mostly 2300 mm or so). In this case, the louvers 2 are arranged separated from the ends of the sink roll 52 by 200 to 800 mm or so.

Below, the optimum dimensions when the sink roll 52 has the above dimensions will be explained. Note that, the entry angle θ of the steel sheet from the vertical direction is usually 25 to 40° or so. The steel sheet 75 which is wound around the sink roll 52 has a width of 600 to 2000 mm.

Figure 4:
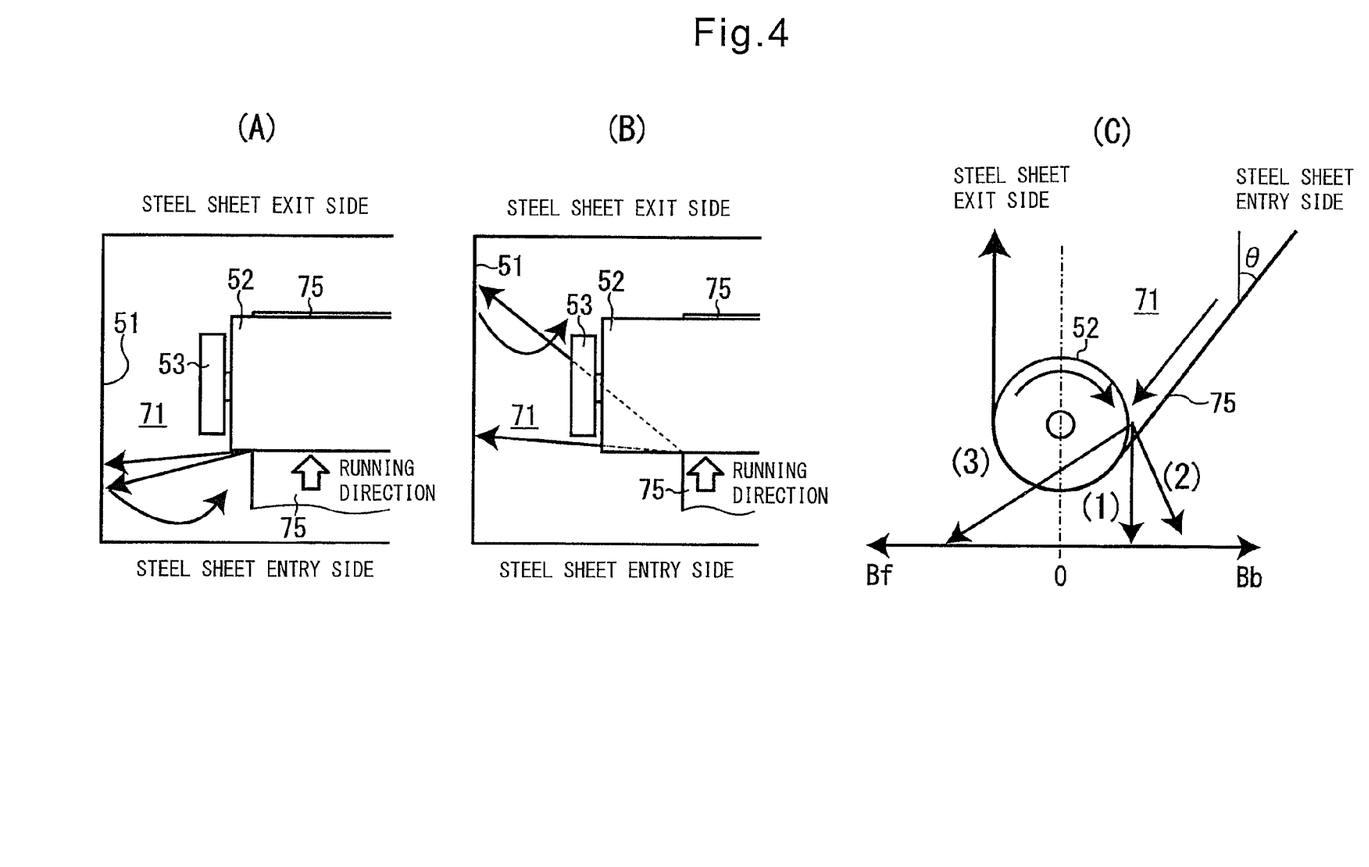
FIG. 4 An explanatory view of a flow of a trailing flow.

Note that, FIGS. 4(A) and (B) are top views of the coating tank 51, while FIG. 4(C) is a side view of a sink roll 52.

When the steel sheet 75 is large in width, as shown in FIG. 4(A), the trailing flow of the molten zinc 71 is discharged from the position where the steel sheet 75 and the sink roll 52 contact to the back and lateral bottom sides of the sink roll 52. If viewing this from the side of the sink roll 52, as shown in FIG. 4(C), (2) the trailing flow of the molten zinc 71 flows downward at the steel sheet entry side from the position where the steel sheet 75 and the sink roll 52 contact. Further, as shown in FIG. 4(C), (1), part of the trailing flow of the molten zinc 71 flows downward toward the sink roll 52 from the position where the steel sheet 75 and the sink roll 52 contact. In this way, when the steel sheet 75 is large in width, the trailing flow of the molten zinc 71 flows toward the back side and the bottom side of the coating tank 51, strikes the side surfaces of the coating tank 51, then changes in direction toward the bottom side of the coating tank 51 and flows downward, and stirs up the bottom dross 72 which deposited at the bottom of the coating tank 51.

When the steel sheet 75 is small in width, as shown in FIG. 4(B), the trailing flow of the molten zinc 71 is discharged to the front and to the lateral bottom side of the sink roll 52 at the position where the steel sheet 75 and the sink roll 52 contact. If viewing this from the side of the sink roll 52, as shown in FIG. 4(C), (3), the trailing flow of the molten zinc 71 flows downward at the steel sheet exit side from the position where the steel sheet 75 and the sink roll 52 contact. Further, as shown in FIG. 4(C), (1), the trailing flow of the molten zinc 71, in the same way as when the steel sheet 75 is large in width, flows toward the bottom of the sink roll 52 from the position where the steel sheet 75 and the sink roll 52 contact. In this way, when the steel sheet 75 is small in width, the trailing flow of the molten zinc 71 flows toward the front and toward the bottom of the coating tank 51, strikes the side surface of the coating tank 51, then changes direction to the bottom side of the coating tank 51 and stirs up the bottom dross 72 which is deposited at the bottom of the coating tank 51.

In this way, depending on the width of the steel sheet 75 which is wound around the sink roll 52, the direction of flow of the trailing flow of the molten zinc 71 changes. For this reason, the louvers 2 have to be able to handle the flows which are created from all widths of steel sheets 75 which are wound around the sink roll 52. As shown in FIG. 1(B) and FIG. 4(C), the preferable width direction dimensions of the louvers 2 will be explained for the case of designating the horizontal direction dimension from the bearing parts of the sink roll 52 to the steel sheet exit side direction as "Bf" and designating the horizontal direction dimension from the bearing parts of the sink roll 52 to the steel sheet entry side direction as "Bb".

If the Bf dimension is smaller than 300 mm or the Bb dimension is smaller than 350 mm, depending on the width of the steel sheet 75, much of the trailing flow of the molten zinc 71 will not strike the louvers 2, but will leak out from the louvers 2. Therefore, the preferable width direction dimensions of the louvers 2 are a Bf dimension of 300 mm or more and a Bb dimension of 350 mm or more. Note that, if the Bf dimension is larger than 500 mm or if the Bb dimension is larger than 850 mm, no further improvement in the effect of dispersion of the trailing flow by the louvers 2 can be obtained. Further, depending on the variation in flow of the trailing flow of the molten zinc 71, even if setting the louvers 2 to the preferable width dimensions, the trailing flow of the molten zinc 71 is liable to leak out from the louvers 2. Therefore, it is more preferable to add 100 mm to the preferable width dimensions of the louvers 2. Therefore, the preferable width dimensions of the louvers 2 are a Bf dimension of 400 to 500 mm and a Bb dimension of 450 to 850 mm.

Note that, the height of the top ends of the louvers 2 from the bottom of the coating tank 51 is preferably made approximately the same height as the bearing parts of the sink roll 52. If the top end positions of the louvers 2 are lower than the bearing parts of the sink roll 52, the trailing flow of the molten zinc 71 is liable to leak out from the louvers 2. On the other hand, even if making the top end positions of the louvers 2 higher than the bearing parts of the sink roll 52 (for example, 50 mm or more from the axial center of the sink roll), no further effect of suppression of stir-up of bottom dross can be obtained.

Figures 5, 6:
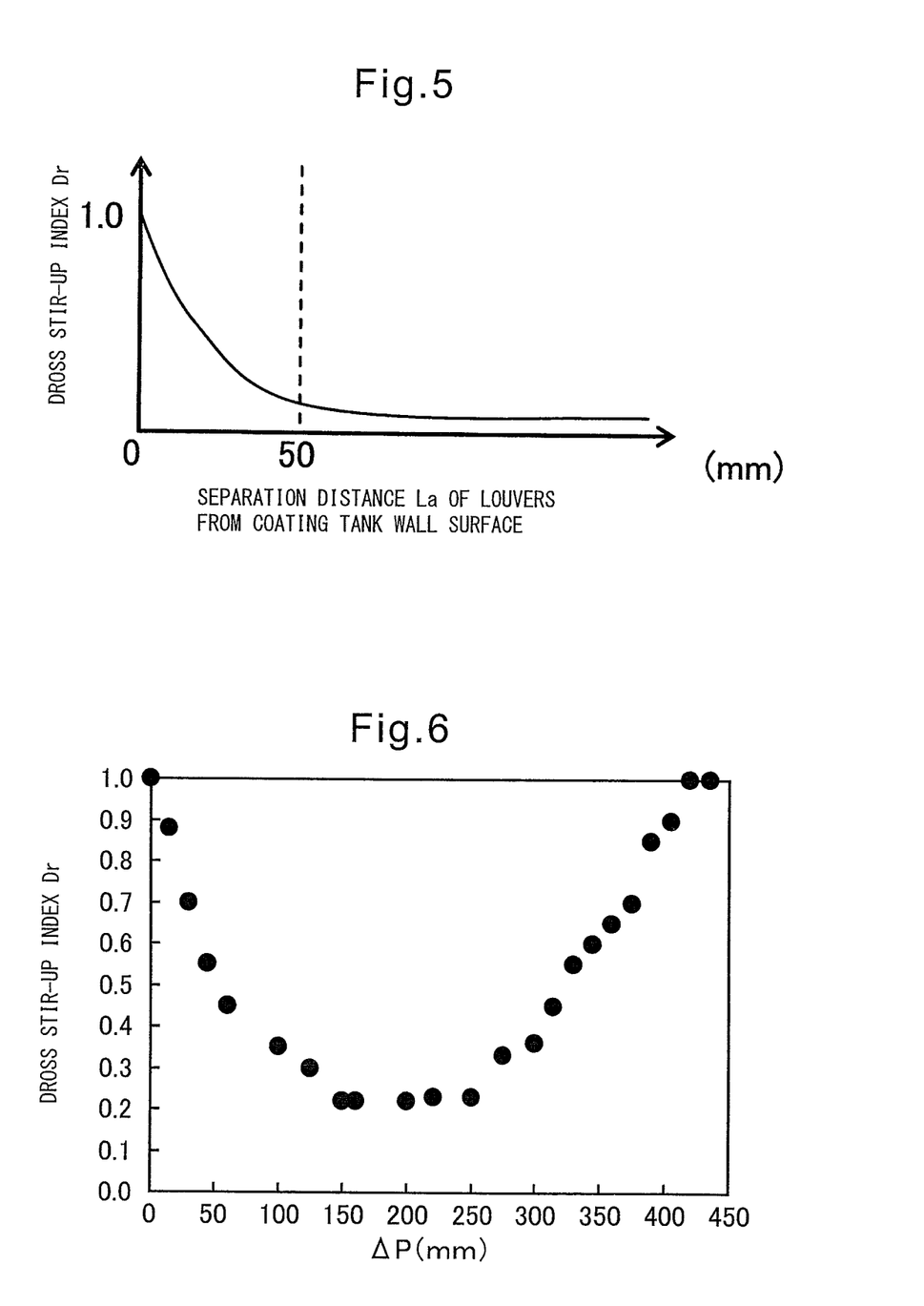
FIG. 5 A graph which shows a relationship between a separation dimension of side plates from wall surfaces of a coating tank and a dross stir-up index.
FIG. 6 A graph which shows a relationship between a pitch between louvers and a dross stir-up index.

Below, using FIG. 5, the optimum separation distance of the louvers 2 from the wall surfaces of the coating tank 51 will be explained. The graph of FIG. 5 is a graph which shows the relationship between the separation dimension La of the louvers 2 from the wall surfaces of the coating tank 51 (shown in FIG. 1(A)) and the dross stir-up index Dr while expressing the dross stir-up index Dr at La=0 mm as "1.0". When obtaining the data of FIG. 5, the above-mentioned water model test was performed.

As shown in the graph of FIG. 5, if the louvers 2 approach the wall surfaces of the coating tank 51 too much, the dispersion effect of the trailing flow of the molten zinc 71 by the louvers 2 can no longer be obtained. As shown in the graph of FIG. 5, if the separation dimension La of the louvers 2 and the wall surfaces of the coating tank 51 becomes smaller than 50 mm, the dross stir-up index suddenly rises. Therefore, the separation dimension La of the louvers 2 and the wall surfaces of the coating tank 51 is preferably 50 mm or more.

Figure 7:
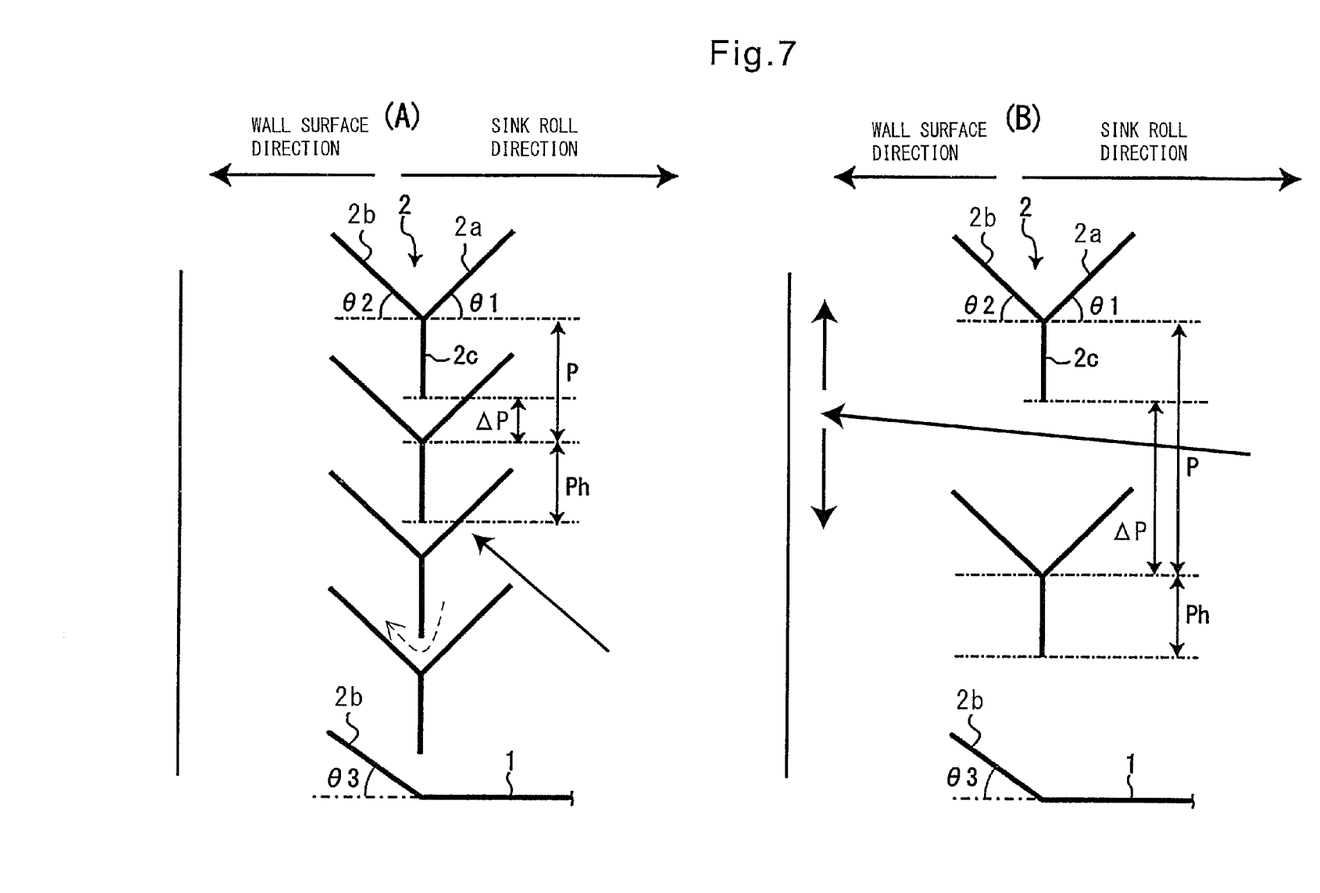
FIG. 7 An explanatory view of an optimum separation distance of a pitch between louvers.

Below, using FIG. 6 and FIG. 7, the optimum value of the pitch ΔP between the bottom end of the flow direction changing member 2b of a louver 2 and the bottom end of the louver 20 which is provided adjoining that louver 2 above it (shown in FIG. 2 or FIG. 7) will be explained. The "bottom end of a louver 2" means the bottom end of a rib in the case where a louver 2 has a rib and a bottom end of a flow direction changing member in the case where it does not have a rib. As shown in FIG. 7A, when ΔP is small, the trailing flow of the molten zinc 71 has an extremely hard time flowing to the wall surface direction of the coating tank 51 and behaves in a manner very similar to Table 1(2) and FIG. 3, (2), so this is not preferable. On the other hand, when ΔP is large, most of the trailing flow which is attenuated in flow by the horizontal plates while changing in the direction of flow is not attenuated by the entrance side members 2a or the ribs 2c. Further, the effect of changing the flow to the upward direction by the flow direction changing members 2b of the louvers 2 also becomes smaller.

FIG. 6 is a graph which shows the relationship between ΔP in the case when making the lengths of the entrance side members 2a and flow direction changing members 2b 100 mm, making the height Ph of ribs 2c 40 mm, making the angle θ1 of the entrance side members 2a with respect to the horizontal plane 30°, and making the angle θ2 of the flow direction changing member 2b with respect to the horizontal plane 60° and the dross stir-up index Dr while expressing the dross stir-up index Dr at θP=0 as "1.0". As shown in FIG. 6, ΔP is preferably 100 to 300 mm, more preferably 150 to 250 mm.

Further, the separation distance Hb of the horizontal plates 1 from the bottom end of the sink roll 52 is not particularly limited, but is preferably 100 to 160 mm from the viewpoint of the dross stir-up. The distance between the horizontal plates 1 and the bottom of the coating tank is also not particularly limited. It is sufficient that a suitable space be maintained. Basically, if the coating tank is sufficiently deep, the problem of stir-up does not arise, but if making the coating tank deeper, a large amount of molten metal becomes necessary and the cost becomes high, so the depth of the coating tank is limited to a certain extent. The distance between the horizontal plates 1 and the bottom of the coating tank is usually 500 to 1500 mm or so.

Figure 8:
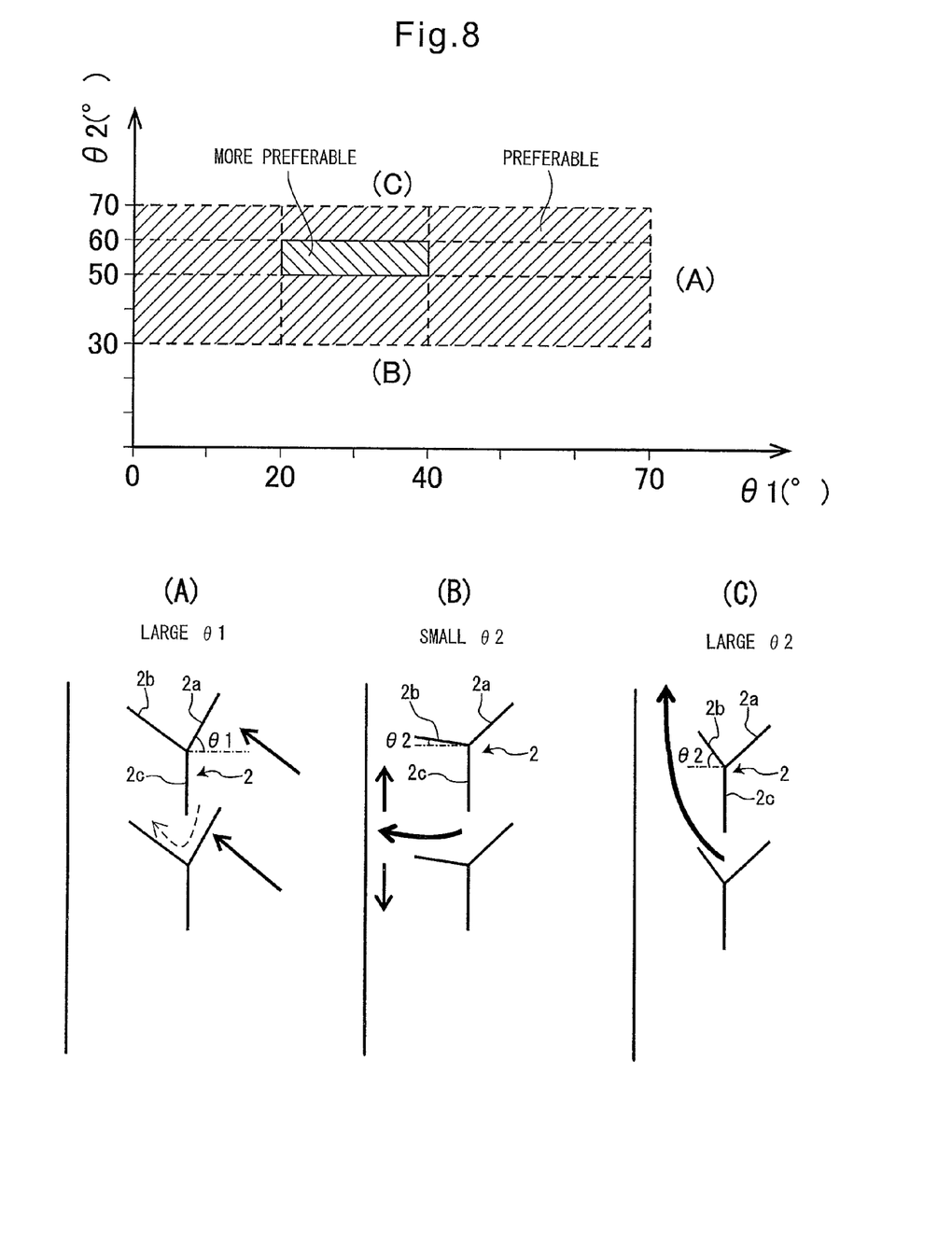
FIG. 8 An explanatory view which shows preferable angles of louvers.

FIG. 8 shows the optimum angles of the entrance side members 2a and flow direction changing members 2b of the louvers 2. In the graph, (A) to (C) correspond to the figures (A) to (C) at the bottom. As shown in FIG. 8(A), when the angle θ1 of the entrance side members 2a from the horizontal direction is large, almost all of the trailing flow of the molten zinc 71 is stopped by the entrance side members 2a and does not flow to the flow direction changing members 2b. On the other hand, as shown in FIG. 8B, when the angle θ2 of the flow direction changing members 2b from the horizontal direction is small, almost no effect is obtained of the trailing flow of the molten zinc 71 being changed in flow to the upward direction by the flow direction changing members 2b. Further, as shown in FIG. 8(C), when the angle θ2 of the flow direction changing members 2b from the horizontal direction is large, the trailing flow of the molten zinc 71 is greatly changed in flow to the upward direction by the flow direction changing members 2b, a strong upward flow is created near the wall surfaces of the coating tank 51, and top dross which flows up at the surface layer of the molten zinc 71 (not shown) deposits on the steel sheet, so quality defects are caused. The above-mentioned top dross is an alloy of the iron which is eluted from the steel sheet and the aluminum which is dissolved in the zinc bath for the purpose of adjusting the ingredients in the zinc bath.

The angles θ1 and θ2 of the entrance side members 2a and flow direction changing members 2b of the louvers 2 with respect to the horizontal plane are preferably an θ1 and θ2 which satisfy −θ2≤θ1≤70° and 20°≤θ2≤40°, more preferably 20°≤θ1≤40° and 30°≤θ2≤70°, still more preferably 50°≤θ2≤60°.

Further, the angle θ3 of the end parts of the horizontal plates 1 is not particularly limited, but is preferably 0 to 70°, more preferably 50 to 60°.

Next, using FIG. 1, the optimum width dimension of the horizontal plates 1 will be explained. As shown in FIG. 1(A), the horizontal plates 1 are laid from below the end parts of the sink roll 52 in the inside directions by exactly a predetermined dimension Lw. The predetermined dimension Lw is preferably 0 to 15% of the barrel length of the sink roll 52. If the predetermined dimension Lw is larger than 15% of the barrel length of the sink roll 52, when making the line stop and the steel sheet 75 droops down, the steel sheet 75 may contact the horizontal plates 1. On the other hand, when the end parts of the horizontal plates 1 are not below the end parts of the sink roll 52, the trailing flow of the molten zinc 71 which is discharged to the lateral bottom sides of the sink roll 52 at the position where the steel sheet 75 and the sink roll 52 contact is liable to not strike the horizontal plates 1 and to stir up the bottom dross 72.

The flow regulating member 10 of the present invention, to secure work efficiency, may also be attached to the edge faces of the coating tank 51 by support members which connect to the flow regulating member 10 and horizontal members which connect to the support members.

EXAMPLES

The flow regulating member 10 of the present invention was placed in an actually operating coating tank 51 and the horizontal plates 1 and louvers 2 were set at preferable places so as to confirm the advantageous effects. The lengths of the entrance side members 2a and the flow direction changing members 2b of the louvers 2 were made 100 mm, the height Ph of the ribs 2c was made 40 mm, θ1=30°, θ2=60°, and ΔP=160 mm. For the method of confirming the advantageous effects, the dross stir-up index was used in the same way as the water model test. However, the particle size and the number of particles of the bottom dross were visually viewed using an electron microscope rather than a solution particle counter.

Figure 9:
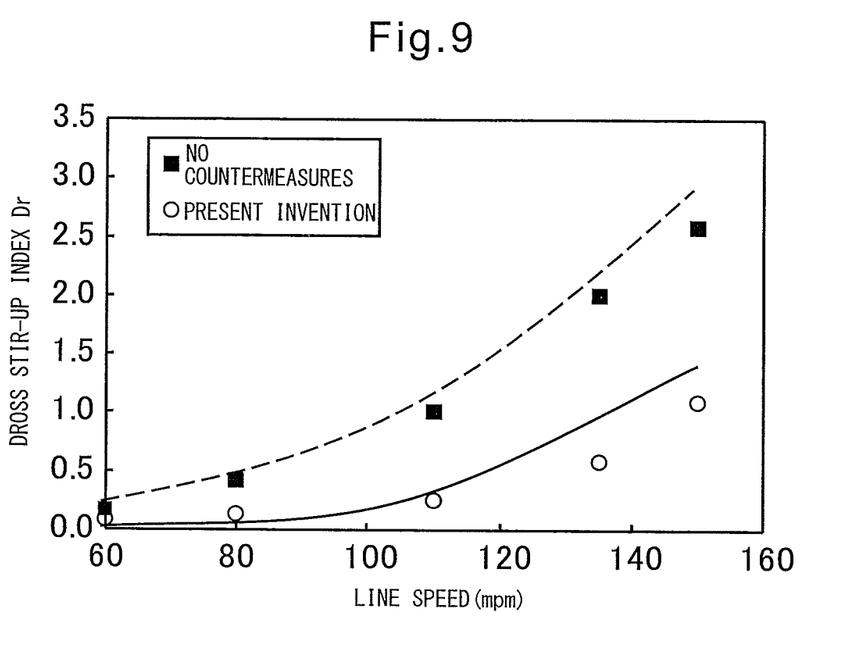
FIG. 9 A graph which shows the advantageous effects of the present invention.

The results are shown in FIG. 9. FIG. 9 is a graph which compares the dross stir-up indexes when using the dross stir-up index Dr at a line speed of 110 mpm with no countermeasures taken as "1.0". As shown in FIG. 9, it could be confirmed that compared with the case of no countermeasures, by installing the flow regulating member of the present invention, it is possible to great lower the dross stir-up index.

Note that, in the embodiments which were explained above, the louvers 2 were comprised of the entrance side members 2a, flow changing members 2b, and ribs 2c, but even if the louvers 2 are comprised of only the flow changing members 2b, the trailing flow of the molten zinc 71 is changed to an upward direction by the flow direction changing members 2b and there is an effect of suppression of stir-up of the bottom dross 72. Further, either of the entrance side members 2a and ribs 2c may be omitted in other embodiments.

Note that, in the embodiments which were explained above, the molten metal which is filled in the coating tank 51 was molten zinc, but the molten metal is not limited to that. Even if tin, copper, or another molten metal, the technical idea of the present invention can be applied needless to say.

Further, in the embodiments which were explained above, the metal sheet material which was wound around the sink roll 52 and subjected to the plating treatment in the coating tank 51 was a steel sheet, but the metal sheet material is not limited to this. Even when subjecting an aluminum sheet, copper sheet, or other metal sheet material to plating treatment, the technical idea of the present invention can be applied needless to say.

Above, the present invention was explained in relation to embodiments which are believed to be the most practical and preferable at the present point of time. Of course, the present invention is not limited to the embodiments which are disclosed in the description of the present application. The present invention may be suitably changed in a range not contravening the gist or idea of the invention which can be read from the claims or the description as a whole. A flow regulating member of a hot dip coating tank which is accompanied with such changes must be understood as being encompassed by the technical scope.

REFERENCE SIGNS LIST 1 horizontal plate
2 louver 2a entrance side member
2b flow direction changing member
2c rib
2d joint
3 support member
3a horizontal member
3b vertical member
10 flow regulating member of hot dip coating tank
51 coating tank
51a edge face
52 sink roll
53 roll support member
71 molten zinc
72 bottom dross
73 tracer simulating bottom dross
75 steel sheet

The invention claimed is:

1. A flow regulating member of a hot dip coating tank characterized by being provided with
horizontal plates which are respectively arranged horizontally from below two side end parts of a sink roll, which is arranged inside of a coating tank in a rotatable manner, toward outside directions of the sink roll and,
as side members, louvers which are arranged above from the end parts of the respective horizontal plates at positions separated from the two ends of the sink roll and which have flow direction changing members which are slanted so that their heights become gradually higher toward the wall surface sides of the coating tank,
wherein said louvers have entrance side members which slant so as to gradually increase in height from joints of base ends of said flow direction changing members and the entrance side members toward said sink roll direction.

2. The flow regulating member of a hot dip coating tank as set forth in claim 1, characterized in that said louvers have plated-shaped ribs which hang down from joints of base ends of said flow direction changing members and the entrance side members.

3. The flow regulating member of a hot dip coating tank as set forth in claim 1, characterized in that a pitch between a bottom end of a flow direction changing member of a louver and the bottom end of the louvers which are provided adjoining said louver above it is 100 to 300 mm.

4. The flow regulating member of a hot dip coating tank as set forth in claim 1, characterized in that an angle $\theta_1$ of entrance side members of said louvers with respect to the horizontal plane and an angle $\theta_2$ of the flow direction changing members with respect to the horizontal satisfy $-\theta_2 \leq \theta_1 \leq 70°$ and $20° \leq \theta_2 \leq 40°$.

5. A continuous hot dip coating system characterized by being provided with a flow regulating member of a hot dip coating tank as set forth in claim 1.

6. The continuous hot dip coating system as set forth in claim 5, characterized in that in said louvers, a horizontal direction dimension from bearing parts of the sink roll in a steel sheet exit side direction is 300 mm or more and in that a horizontal direction dimension from bearing parts of the sink roll in a steel sheet entry side direction is 350 mm or more.

7. The continuous hot dip coating system as set forth in claim 5, characterized in that a separation dimension of said louvers and wall surfaces in sink roll axis direction of the coating tank is 50 mm or more.

8. The continuous hot dip coating system as set forth in claim 5, characterized in that said flow regulating member is laid from below the end parts of the sink roll in inside directions of 0 to 15% of a barrel length of the sink roll.

9. The continuous hot dip coating system as set forth in claim 5, characterized in that the flow regulating member is attached by the support members and horizontal members to edge faces of the hot dip coating tank.

* * * * *

UNITED STATES PATENT AND TRADEMARK OFFICE
CERTIFICATE OF CORRECTION

PATENT NO. : 8,887,661 B2
APPLICATION NO. : 13/995314
DATED : November 18, 2014
INVENTOR(S) : Mikio Kawamura et al.

Page 1 of 1

It is certified that error appears in the above-identified patent and that said Letters Patent is hereby corrected as shown below:

In the Specification

Column 9, line 49, change "20°θ2≤40°," to -- 20°≤θ2≤40°, --.

Signed and Sealed this
Sixteenth Day of June, 2015

Michelle K. Lee
*Director of the United States Patent and Trademark Office*